Oct. 16, 1945.                S. S. RUBENSTEIN                2,386,815
                                  BROILER
                            Filed July 30, 1942          2 Sheets-Sheet 1

Inventor
Samuel S. Rubenstein
By Rockwell & Bartholow
Attorneys

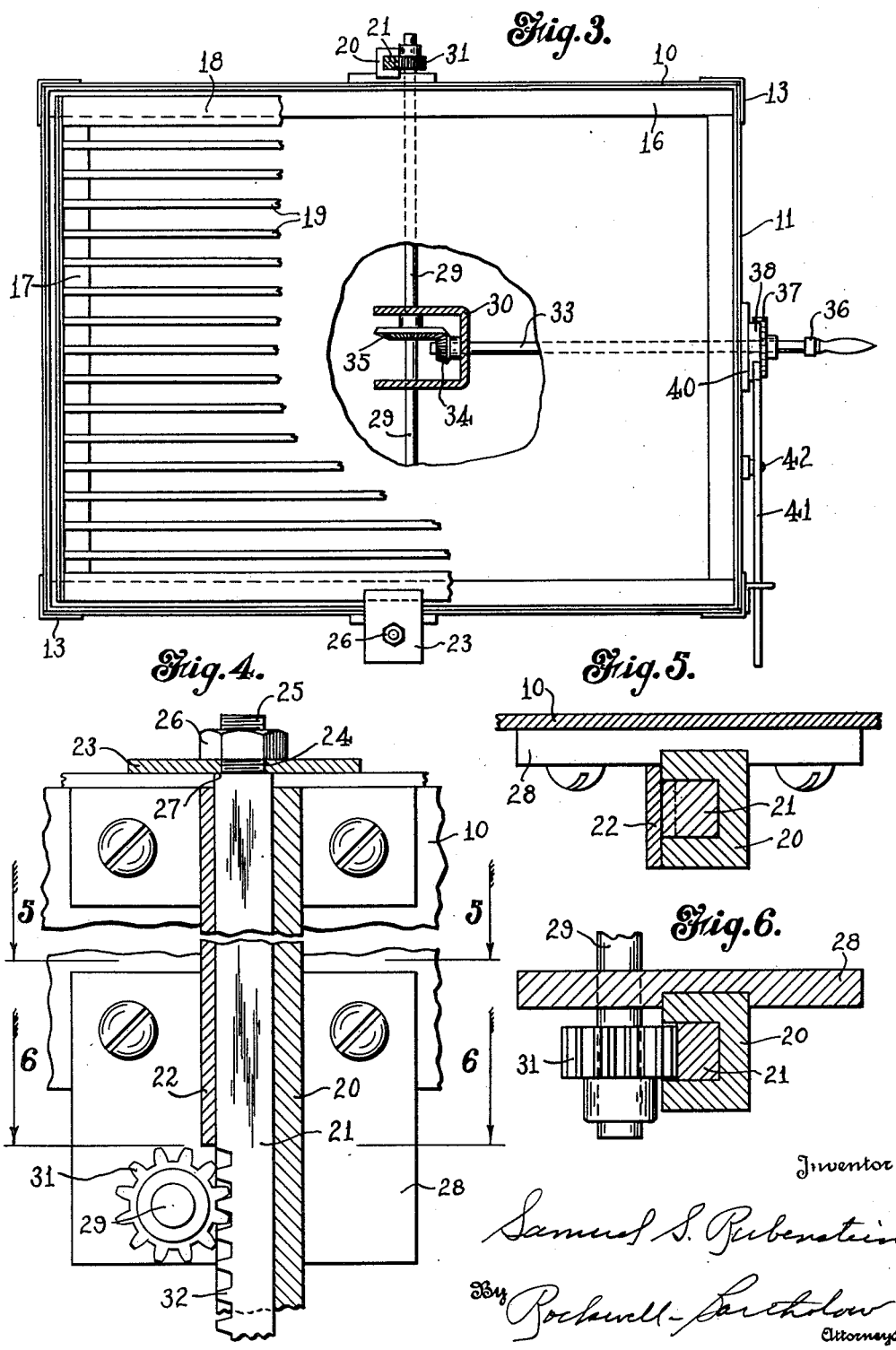

Patented Oct. 16, 1945

2,386,815

UNITED STATES PATENT OFFICE 2,386,815

BROILER

Samuel S. Rubenstein, New Haven, Conn., now by judicial change of name Samuel S. Roberts Application July 30, 1942, Serial No. 452,918

2 Claims. (Cl. 126—25)

This invention relates to broilers, and more particularly to that type of broiler provided with a firebox for the fuel and a grill disposed above the fuel, upon which the material to be broiled is placed. It particularly relates to a device of this kind wherein the grill may be adjusted vertically relatively to the firebox, so that the distance of the grill from the fuel may be regulated as desired.

One object of the invention is the provision of a broiler of this character which shall be of relatively simple and inexpensive construction, and which may be provided with a vertically adjustable grill adapted to be raised and lowered with respect to the firebox.

A still further object of the invention is to provide a broiler of the character described, which may be of compact form and wherein the grill is mounted upon the top of standards slidably carried by the firebox, whereby any necessity for superstructure or other supporting elements above the firebox is avoided.

A still further object of the invention is the provision of a broiler having a grill adapted to be raised and lowered with respect to the firebox, and novel and convenient means for raising and lowering the grill and holding it in raised position.

To these and other ends the invention consists in the novel features and combinations of parts to be hereinafter described and claimed.

In the accompanying drawings:

Fig. 3 is a top plan view of the grill having certain parts broken away for the sake of clearness;

Fig. 4 is a sectional view on line 4—4 of Fig. 1;

Fig. 5 is a sectional view on line 5—5 of Fig. 4; and

Fig. 6 is a sectional view on line 6—6 of Fig. 4.

Figure 1:
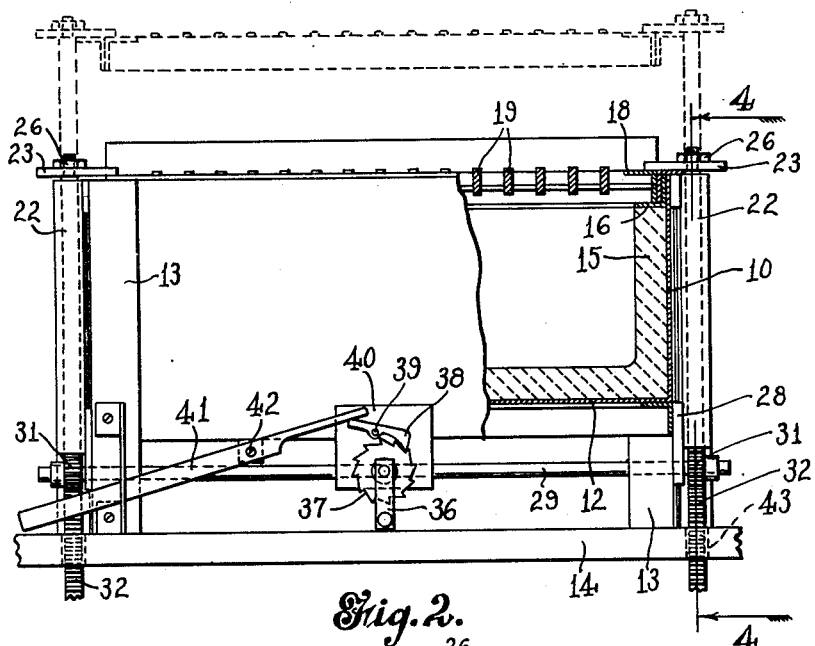
Fig. 1 is a front elevational view of a broiler embodying my invention, some parts being broken away for the sake of clearness.
Figure 2:
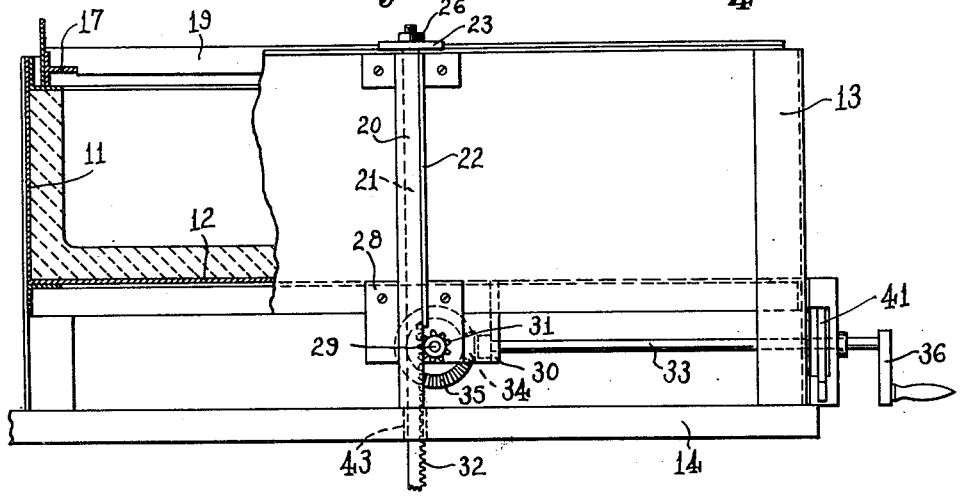
Fig. 2 is a side view of the grill, this view also having certain parts broken away.

To illustrate a preferred embodiment of my invention, I have shown a broiler comprising a firebox substantially rectangular in shape, having opposite side members 10, end members 11, and a bottom 12, the structure being open at the top. This firebox may be conveniently made of sheet metal, although its particular construction and shape is not of importance in all aspects of the present invention. At the corners of the box are secured angle irons 13, which, as shown in Figs. 1 and 2, extend downwardly and serve to support the structure from a table or other supporting base 14.

The box may be lined with suitable refractory material or other lining 15, and the fuel, such as charcoal, is designed to be placed upon and within this lining. At the top of the lining is an angle iron 16 extending around the four sides of the box, which will serve to support the grill or grid to be described hereinafter.

The grill may consist of a rectangular frame comprising end members 17 of T-shaped form, and side members 18 secured together to make a rigid frame. Between the end members the grill bars 19 extend, these bars being supported upon the horizontal web portion of the members 17, and may be secured thereto, or may be removable therefrom. The longitudinally extending members 19 are spaced apart, as shown in Fig. 1, so as to form an openwork grill or grid upon which the material to be broiled may be placed, and through which the heat will pass from the fuel in the firebox.

Upon each of the side members 10 at substantially the central portion thereof is secured a channel-shaped structure 20 forming a guide or sleeveway for the standards 21. The guideways are closed by plates 22, and, as shown in Fig. 4, these plates are somewhat shorter than the channel-shaped members 20, for a purpose to be hereinafter explained. Plates 23 are secured to the grid as by welding adjacent the upper portion of the standards 21, and these plates are carried by the upper ends of the standard and are secured thereto by means of perforations 24 in the plates to receive the upper reduced ends 25 of the standards, which reduced ends are threaded to receive the nuts 26. The plates 23, as will be apparent from Fig. 4, rest upon shoulders 27 at the upper ends of the standards. It will be obvious that with this construction the grill is carried upon the standards 21, and when the latter is raised and lowered, the grill will likewise be raised and lowered, as shown in dotted lines in Fig. 1.

Plates 28 are secured to the side members 10, and a shaft 29 is rotatably journaled in these plates and in a U-shaped bracket 30 secured to the bottom of the firebox, the shaft having rigidly secured thereto adjacent its ends pinions 31 the teeth of which mesh with rack teeth 32 formed on the stndards 21, so that when the shaft 29 is rotated, the standards and grill will be elevated or lowered, depending upon the direction of rotation.

As shown in Fig. 3, a second shaft 33 is journaled in the bracket 30 and a plate 40 secured at the front end of the firebox, which shaft carries upon its inner end a bevel gear 34 meshing with bevel gear 35 secured to the shaft 29. Upon the outer end of the shaft 33, at the front of the firebox, is a crank 36 by which this shaft 33 may be rotated so as to rotate the raising shaft 29.

Also at the front side of the firebox and exteriorly thereto a ratchet wheel 37 is secured to the shaft 33, with which cooperates a pawl member 38 pivoted at 39 to the plate 40 secured to the firebox. A releasing lever 41 is pivoted at 42 to a lug secured to a part of the firebox, and the inner end of this lever is adapted to engage one end of the pawl 38, so as to effect the release of the pawl from the teeth of the ratchet 37 when it is desired to lower the grill. It will be understood that the pawl will be so weighted as to normally engage the teeth of the ratchet 37 and prevent rotation of the shaft 33 in a direction to permit the lowering of the grill, but will permit the rotation of the shaft in a direction to elevate the grill.

It will be noted from Fig. 4 that the plate 22 terminates above the pinions 31 so as to permit the teeth of this pinion to engage the rack teeth 32. It may also be noted that the standards 21 are, as shown in Figs. 1 and 2, somewhat longer than the channel guide members 20, and when the grill is in its lowermost position, as shown in full lines in Fig. 1, the lower ends of these standards extend downwardly through openings 43 in the table 14. The extension of the lower ends of the standards permits a long bearing in the channel guide members 20, even though the grid be raised to a considerable height, and it is, of course, necessary to extend these members as far below the pinions 31 as the height to which the grill is to be elevated.

It will be apparent that, as shown in Fig. 1, the grill is substantially the highest portion of the broiler, as there is no superstructure or framework above the same, thus providing a very compact device and eliminating any structure above the grill which would interfere with the operations of the user. It will also be apparent that by rotating the crank 36 the grill may be elevated to any desired position to regulate the heat of the fuel which reaches the material being broiled, and that when the grill has been raised to the desired position it will be held at such adjusted position by the pawl 38. When it is desired to lower the grill, the outer end of the lever 41 is raised, thus depressing the inner end adjacent the pawl 38 and raising this member out of engagement with the teeth of the ratchet 37, and permitting the grill to be lowered under control of the crank 36, or to drop downwardly under its own weight.

While I have shown and described a preferred embodiment of my invention, it will be understood that it is not to be limited to all of the details shown, but is capable of modification and variation within the spirit of the invention and the scope of the claims.

What I claim is:

1. A broiler comprising a fuel-containing firebox having a bottom and upstanding sides, means for supporting said box from a base with the bottom thereof in spaced position above the base, a pair of standards, one slidably mounted upon the outer face of each of two opposite upstanding sides of the box, means forming a guideway on the outer face of each of said sides of the box in which the corresponding standard is disposed, a food-supporting grill carried by said standards adjacent the upper ends thereof above the fuel in the box, means for raising and lowering said standards comprising rack teeth on the standards below the grill, a shaft rotatably mounted below the bottom of the box, and pinions on said shaft engaging the rack teeth, means for rotatably supporting said shaft from the box, a second shaft extending transversely to the first shaft to a point adjacent the front of the firebox, gearing connecting said shafts, means at the front of the firebox for rotating said second shaft, a ratchet wheel on said second shaft, a pawl engaging the teeth of said wheel to hold the grill in elevated position, and a lever for moving said pawl to inoperative position to permit lowering of the standards and grill.

2. A broiler comprising a firebox open at the top and having opposed side members and opposed end members, means for supporting said box from a base with the bottom thereof in spaced relation to the base, means providing a vertically disposed guideway on the outer face of each of said side members, a standard slidably mounted in each of said guideways, said standards being of greater length than the height of the side members and extending below the bottom of the firebox, a grill secured to said standards adjacent the upper ends thereof and disposed above the firebox to substantially cover the same, a shaft extending transversely across the firebox below the same, means secured to and depending from the firebox in which the shaft is rotatably mounted, means connecting said shaft to said standards to elevate the latter upon rotation of the shaft, and means at the front of the firebox and below the same for rotating said shaft.

SAMUEL S. RUBENSTEIN.